C. La Dow,
Comb'd Rake & Tedder.

No. 113,066.         Patented Mar. 28, 1871.

Witnesses:        Inventor:
C. Raettig           C. La Dow.
Wm. H. C. Smith.
                     per Munn & Co.
                     Attorneys.

UNITED STATES PATENT OFFICE.

CHARLES LA DOW, OF SOUTH GALWAY, NEW YORK.

IMPROVEMENT IN COMBINED HAY RAKES AND TEDDERS.

Specification forming part of Letters Patent No. 113,066, dated March 28, 1871.

*To all whom it may concern:*

Be it known that I, CHARLES LA DOW, of South Galway, in the county of Saratoga and State of New York, have invented a new and useful Improvement in Combined Hay Rake and Tedder; and I do hereby declare that the following is a full, clear, and exact description thereof, which will enable others skilled in the art to make and use the same, reference being had to the accompanying drawing, forming part of this specification, in which—

Figure 1:
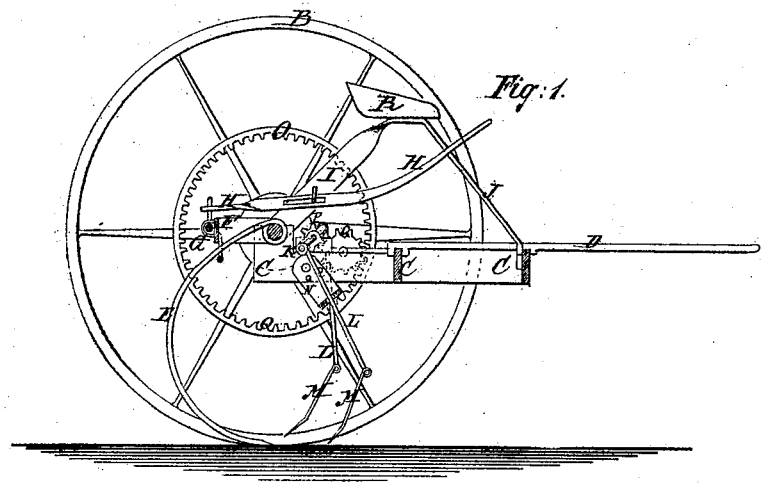
Figure 2:
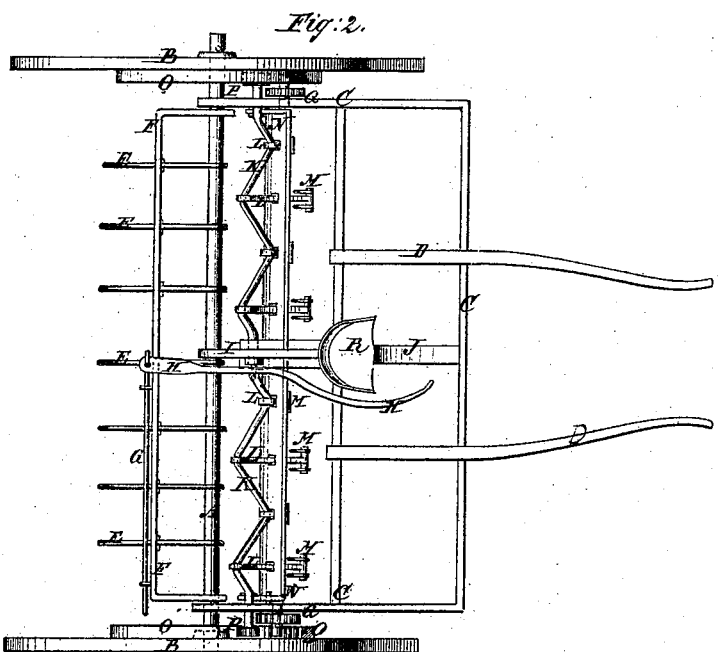

Figure 1 is a detail vertical cross-section of my improved machine. Fig. 2 is a top view of the same.

Similar letters of reference indicate corresponding parts.

My invention has for its object to furnish an improved combined hay rake and tedder, which shall be simple in construction, easily operated, and effective in operation, doing its work equally well in either capacity; and it consists in the construction and combination of various parts of the machine, as hereinafter more fully described.

A is the axle, upon the journals of which the wheels B are placed. C is the frame of the machine, the rear ends of the side bars of which are connected with the axle A, and to which the shafts D are rigidly attached. E are the rake-teeth, the upper ends of which are coiled around and are secured to the axle A.

The rake-teeth E are bent into the desired form, so as to take the hay directly beneath the axle, and are passed through keepers attached to the bar F, which extends across the machine in the rear of and parallel with the axle A. The ends of the bar F are bent forward, and have holes formed through them, through which the axle A passes, so that by moving the bar F upward the rake-teeth E may be raised from the ground to discharge the collected hay.

G is a bar extending along the rear side of the bar F, and working longitudinally in keepers attached to said bar. To the inner end of the bar G is pivoted the rear end of the lever H. The lever H is pivoted to the side of the rear seat-support, I, by a pin or bolt attached to the support I, and passing through a slot in the lever H. The forward end of the lever H is curved, as shown in Fig. 2.

By this construction, when it is desired to discharge the hay from the rake the forward end of the lever H is moved to the left, which causes the end of the bar G to project, so as to pass between the spokes of the wheel B, so that as the machine is drawn forward the wheels B may raise the bar F and with it the rake-teeth E.

As the rake-teeth are raised the curved forward end of the lever H slides down along the forward seat-support, J, which pushes the said forward end of the lever H to the right, drawing the bar G inward, so that as the hay is discharged from the rake-teeth the said rake-teeth may be allowed to drop to the ground by their own weight.

When the rake-teeth are not required for use they are raised by hand, and the forward end of the lever H is passed beneath the lower part of the support J.

K are two shafts, the outer ends of which are pivoted to the side bars of the frame C, and the inner ends of which are pivoted to a central bar of said frame. The shafts K are bent into zigzag form, or have cranks formed upon them, as shown in Fig. 2, and to them, at each of their angles or cranks, is pivoted the upper end of a shank, L, of a tedder-fork, M. The tedder-forks M are made elastic, so that they may give, and not be broken, should they strike an obstruction.

The shanks L of the tedder-forks M pass through holes in the bar N, which thus acts as a fulcrum to the tedder-fork shanks L, so that as the shafts K revolve the forks M may take hold of the grass directly beneath the axle A and throw it upward and rearward.

The ends of the bar N are bent at right angles, and are pivoted to the side bars of the frame C, so that it may be turned down into the position shown in Figs. 1 and 2 when the machine is to be used as a tedder, in which case the rake-teeth E are raised from the ground and secured, as hereinbefore described.

When the machine is to be used as a rake the bar N is swung to the rearward, so as to raise the tedder-forks L M into, or nearly into, a horizontal position, in which position they serve as stops to push the hay from the rake-teeth E as said rake-teeth are raised, in the manner hereinbefore described.

The bar N is secured in either position by a pin which passes through a hole in the side bar of the frame C and through one or the other of the holes in the turned-up ends of the said bar N.

O are gear-wheels, attached to or formed upon the drive-wheels B. P are small gear-wheels, pivoted to the outer ends of the shafts K in such positions as to be in line with the gear-wheels O. Q are gear-wheels, of such a size as to fit into the spaces between the gear-wheels O and the gear-wheels P, and which are placed upon the ends of journals attached to the side bars of the frame C, and are secured to said journals in such a way that they may be slid longitudinally upon said journals, so that they may be moved outward to throw them into gear with the wheels O P when the machine is to be used as a tedder, and may be moved inward to throw them out of gear with said wheels when the machine to be used as a rake.

The wheels Q are secured in position by pins passed through the projecting ends of the said shafts K, and which are upon the outside of the wheels Q when out of gear with the wheels O P, and upon the inside of the said wheels Q when in gear with the said wheels O P.

The driver's seat R is attached to the upper ends of the supports I. The lower end of the support I is attached to and rides upon the axle A, and the lower end of the support J is attached to the frame C.

Having thus described my invention, I claim as new and desire to secure by Letters Patent—

1. The pivoted bar N, arranged to support the tedder-forks horizontally when not at work, to act as clearers for the rake, and to serve as a fulcrum to said forks when at work, substantially as herein shown and described.

2. The combination of the rake D E F and tedder K L M N with each other and with the frame C, wheels B, and axle A, substantially as herein shown and described, and for the purposes set forth.

CHARLES LA DOW.

Witnesses:
  M. McWILLIAMS,
  JOHN LA DOW.